United States Patent [19]

Meyer et al.

[11] Patent Number: 4,555,544

[45] Date of Patent: Nov. 26, 1985

[54] HARDENING PHENOL-FORMALDEHYDE RESOLS IN THE PRESENCE OF ANILINE

[75] Inventors: Nicolas Meyer, Lens; Michel Cousin, Loison sous Lens, both of France

[73] Assignee: CDF Chimie, S.A., Paris, France

[21] Appl. No.: 687,230

[22] Filed: Dec. 28, 1984

[30] Foreign Application Priority Data

Dec. 30, 1983 [FR] France ................... 83 21058

[51] Int. Cl.⁴ .................. C08G 8/32; C08G 8/28; C08G 14/06

[52] U.S. Cl. .................. 524/595; 428/436; 428/524; 524/35; 524/594; 525/504; 525/505; 528/129; 528/145; 528/158; 528/162; 528/163; 528/171

[58] Field of Search .......... 528/171, 145, 129, 162, 528/158, 163; 525/504, 505; 524/35, 594, 595; 428/436, 524

[56] References Cited

U.S. PATENT DOCUMENTS

| | | | |
|---|---|---|---|
| 942,809 | 12/1909 | Baekeland | 528/145 X |
| 1,667,675 | 4/1928 | Potter et al. | 528/145 X |
| 2,272,742 | 2/1942 | Fiedler | 524/594 X |
| 2,319,142 | 5/1943 | LeBach | 524/595 X |
| 2,552,025 | 5/1951 | Barr, Jr. | 528/145 X |
| 2,563,614 | 8/1951 | Palmer | 528/145 X |
| 2,666,037 | 1/1954 | Ingrassia | 524/595 X |
| 2,934,511 | 4/1960 | Auerbach et al. | 528/145 X |
| 3,471,443 | 10/1969 | Bornstein | 525/504 X |
| 3,476,706 | 11/1969 | Bornstein | 525/504 X |
| 3,616,046 | 10/1971 | Benzinger et al. | 528/145 X |
| 3,714,121 | 1/1973 | Kobel et al. | 525/504 X |
| 3,947,425 | 3/1976 | Freeman et al. | 525/504 X |
| 4,003,873 | 1/1977 | Smith | 525/504 X |
| 4,102,832 | 7/1978 | Weissenfels et al. | 528/171 X |
| 4,123,414 | 10/1978 | Milette | 523/342 |
| 4,252,938 | 2/1981 | Valgin et al. | 528/158 X |
| 4,253,999 | 3/1981 | Okishi | 524/35 X |
| 4,272,403 | 6/1981 | Meyer et al. | 524/595 X |

*Primary Examiner*—Howard E. Schain
*Attorney, Agent, or Firm*—Millen & White

[57] ABSTRACT

In a process for hardening phenol-formaldehyde resol resins, comprising conducting the hardening of the resins with an acidic solution of water and/or an organic solvent having dissolved therein an aromatic sulphonic acid and/or concentrated sulphuric acid, the improvement comprising the hardening in the presence of aniline added to the phenolic resin beforehand in a quantity of between about 0.5 and 2% relative to the weight of the phenolic resin whereby the pot life is extended and the cure time is satisfactory, the resultant products being especially useful as prepegs.

13 Claims, No Drawings

HARDENING PHENOL-FORMALDEHYDE RESOLS IN THE PRESENCE OF ANILINE

BACKGROUND OF THE INVENTION

The present invention relates to a new system for curing phenolic resins, and in particular to a system for using phenol-formaldehyde resols.

The curing of phenolic resols by the addition of strong acids is known. For example, hydrochloric acid, sulphuric acid, phosphoric acid, trichlorolacetic acid, and sulphonic acids are employed as acids, either alone or as mixtures. Most frequently, these acids are used in the form of aqueous solutions at concentrations ranging between 20 and 70%. (Such curing agents are also referred to herein as hardening agents or catalysts.)

For some applications, the phenolic resins are conventionally cured in the presence of reinforcing agents, e.g. cellulose or glass fibers, non-woven fibers made of high molecular weight polester or of polyvinyl chloride for example, or glass mat, or cloth made, for example, of an aromatic polyamide, glass or asbestos. After preliminary curing of the phenolic resin, the composite obtained is then finally hardened at a temperature generally in the region of 90° C.

In the manufacture of some reinforced compositions it is sometimes essential to be able to increase the pot or shelf life of the phenolic resin at ambient temperature, on the one hand, but also to permit a high rate of hardening of the resin when the composition is cured at higher temperatures. It can be seen therefore that in practice there are two opposing problems to be solved. On the one hand, the resin must not harden too quickly in the cold but, on the other hand, it is also necessary that it retains a hardening potential which is sufficient to enable it to be quickly cross-linked when heated.

As examples of reinforced compositions where it is necessary to solve the problems outlined above, mention can be made of the manufacture of phenolic prepegs, the manufacture of phenolic materials prepared by filament winding, and the manufacture of articles by the "pultrusion" technique, a technique consisting of pulling the finished product by making it pass through a die.

The equipment employed for the manufacture of materials prepared by filament winding comprises, in brief, an impregnation trough containing the phenolic resin and curing agent, in which the glass fibers are impregnated. After impregnation the fibers are drained and then reeled around a mandrel before being hardened in an oven at temperature of between 60° and 90° C. The techniques employing pultrusion involve the impregnation of reinforcing agents with the aid of resins. This impregnation is carried out with impregnation troughs which contain the resin to which a curing agent has been added. The impregnation is followed by a heating stage which make it possible to carry out the polymerization of the resin and then a stage of drawing with the aid of a heated die in which the polymerization of the resin is continued. If appropriate, the heating stage may be carried out after the passage through the die. The reinforcing agents employed in the pultrusion technique generally consist of glass fiber rovings. The phenolic resins are particularly suitable for the use of the pultrusion technique. Whether the materials are manufactured by the filament winding techniques or by the pultrusion technique, it is essential, in order to avoid losing large quantities of resins that the phenolic resin does not harden too quickly in the impregnation troughs which are kept at ambient temperature. Furthermore, it is also necessary and advantageous that after impregnation of the fibers, the phenolic resin can harden when heated and that it does so quickly in order that the material obtained occupies the oven for a minimum time.

To solve these problems, it is possible to reduce the concentration of the acid hardener solution and to employ aqueous solutions which have an acid concentration below 20%. In this case, large quantities of water are carried along, which effectively increase the pot life at ambient temperature but which have the disadvantages of reducing the rate of hardening when heated and imparting imperfections to the finished products, in the form of blisters and micropits. It has also been proposed to replace the water completely with organic solvents to obtain dilute acid solutions. In this case, an increase in the pot life at ambient temperature is, in fact, observed, but so is a reduction in the rate of hardening when heated; moreover, it is observed that excessive quantities of solvents are found in the finished products and cause, in particular, a decrease in the mechanical properties of these products, which in most cases is reflected in cracks. In addition, the use of these solvents presents storage and toxicity problems which can only be solved by the use of costly extraction equipment. From an economic point of view, there is, therefore, no advantage in using curing agents dissolved in organic solvents.

SUMMARY OF THE INVENTION

An object of this invention, therefore, is to provide an improved system, incorporating both process and product aspects, which will result in a more satisfactory combination of a long pot life and a high thermal curing rate.

Upon further study of the specification and appended claims, further objects and advantages of this invention will become apparent to those skilled in the art.

The hardening of the resins is carried out with the aid of solutions in water and/or organic solvents of an acid, especially an aromatic sulphonic acid and/or concentrated sulphuric acid, wherein the improvement comprises conducting the acid hardening in the presence of aniline previously added to the phenolic resin.

It is also important that the quantiy of aniline employed is between 0.5 and preferably not more than about 2% relative to the weight of the phenolic resin and preferably between 0.8 and 1.5%. Below 0.5% no substantial effect is observed on the pot life at ambient temperature or on the rate of hardening when the resin containing the hardener is heated. Above 2% by weight, it has been found that the content of free aniline can no longer be tolerated insofar as the toxicity of the resin is concerned. Moreover, with higher quantities of aniline, e.g. 3%, the resol produces a gel which does not harden when heated for industrially acceptable residence times.

By this invention, it is possible to carefully adjust the pot lives and the rates of thermal hardening. (By thermal hardening is meant at a temperature of generally about 70° to 100° C., especially 90° C.)

Surprisingly, it has been found that the aniline employed within the limits claimed according to the invention not only has a positive effect on the abovementioned characteristics of the phenolic resins but, in addition, but also that it was present, after being added to the resin, in free form within limits which can be tolerated from the point of view of toxicology. It is as if the aniline was combined with the products present in the resol while having no negative effect on the reactivity of these resols. Given that the resols contain free formaldehyde, it might have been thought that the addition products of formaldehyde and aniline prepared beforehand and then added to the resol would have had the same effect as the aniline added to the resol according to the process of the invention. But this is not the case; in fact it has been found that the products of addition of formaldehyde and aniline which are prepared beforehand and then added to resol are insoluble in the latter.

According to an important characteristic of the process of the invention, aniline is therefore added to the phenolic resin not at the time of its use, that is to say just before being catalyzed with the aid of hardening catalysts, but it is added before sale. In fact is has been found surprisingly that the aniline added in this manner has a beneficial effect on the pot life at ambient temperature of the mixture constituted with phenolic resin, catalyst and aniline and also on the hardening when heated with the aid of conventional catalysts.

Furthermore, it might have been thought that since the invention produced very good results with aniline, a chemical compound containing an amine function, that straight-chain amines or other aromatic amines might also be useful to the same degree. It has been found, however, that amines such as diethylamine, methylethylaniline, or polyamines, had no effect on the resols because they are incompatible with the latter from the point of view of miscibility or, as in the case of diethylaniline, have only a very limited effect.

The hardening of the phenolic resins is conducted conventionally with the aid of catalysts consisting essentially of an acid and water and/or and organic solvent. Without restriction being intended, conventional acids are para-toluenesulphonic, ortho-toluenesulphonic, benzenesulphonic and xylenesulphonic acids. By organic solvents are meant compounds containing an alcohol function, methanol, ethanol, propanol, isopropanol, as well as polyols such as glycerol, dipropylene glycol and triethylene glycol. The concentration of the acid is generally on a weight basis about 20 to 80%, preferably 30 to 60%.

The quantities of hardening catalysts employed are those conventionally employed for hardening resols. These quantities (meaning the acid with water and/or solvent) are between 4 and 25% by weight relative to the weight of the resol and preferably between 6 and 12%. The resols employed are conventional resols prepared by the condensation of formaldehyde with phenol in the presence of an alkaline catalyst. They have a molar ratio (f/p) of between 1.5 and 2.5 and may, if appropriate, contain conventional additives such as plasticizers, surfactants, fillers, and the like.

Accordingly, a composition aspect of this invention consists essentially of a resol having a formaldehyde to phenol ratio (f/p) between about 1.5 to 2.5; and about 0.5 to 2% preferably about 0.8 to 1.5% of aniline relative to weight of the phenolic resin.

The present invention is perfectly suitable in some processes for manufacturing phenolic prepegs and in processes for manufacturing reinforced composition employing equipment in which the phenolic resin to which the hardening catalyst has been added is stored in a vessel through which glass fibers which are thus impregnated with phenolic resin pass continuously. In general, the invention is suitable in all cases where the phenolic resin should have an extended pot life but should also be capable of being rapidly hardened when heated.

Another aspect of this invention relates to the hardened products produced on the basis of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A phenol-formaldehyde resin with a molar ratio f/p of 1.5 was mixed in a rotary drum with variable quantities of aniline, 8% of a curing agent (also called catalyst in the following examples) consisting of paratoluenesulphonic acid dissolved at a concentration of 60% in water was added, the following results were obtained:

| Aniline % by weight | Gel time at 20° C. (minutes) |
| --- | --- |
| 0 | 8 |
| 1 | 18 |
| 1.2 | 20 |
| 1.5 | 23 |

EXAMPLE 2

Example 1 is repeated with the use of a resol of an identical molar ratio f/p but which has a reactivity of 80° C. instead of 110° C. The reactivity is defined by the exothermic peak of a mixture consisting of 100 parts of resin and a 50% strength solution of sulphuric acid. The following results are obtained by using 10% by weight of catalyst consisting of a 50% strength solution of sulphonic acid, 5% of phosphoric acid, the remainder being water.

| ANILINE % BY WEIGHT | GEL TIME AT 20° C. (minutes) | REACTIVITY WHEN HEATED | |
| --- | --- | --- | --- |
| | | Temperature °C. | Peak (minutes) |
| 0 | 10 | 116° C. | 14 |
| 1 | 21 | 120° C. | 29 |
| 2 | 40 | 104° C. | 40 |
| 3 | Gel very soft after 4 h | 40° C. | |

It is thus found that at high aniline contents namely 3% there is no formation of soft gel at ambient temperature. Thus, if a cure of this resin is to be carried out, it will therefore be necessary to heat for a very long time to obtain the hardening of the resin, which is industrially unacceptable.

EXAMPLE 3

Example 1 is repeated but with the use of a phenolic resin with a molar ratio f/p of 2. The resin is then hardened with the aid of 15% by weight of the same catalyst employed in Example 2.

The following table shows the results obtained:

| ANILINE % BY WEIGHT | CATALYST % BY WEIGHT | GEL TIME AT 20°C. (minutes) | REACTIVITY WHEN HEATED Temperature (°C.) | Peak (minutes) |
|---|---|---|---|---|
| 0 | 15 | 12 | 92 | 17 |
| 1 | 15 | 25 | 70 | 32 |

EXAMPLE 4 (COMPARATIVE)

A phenolic resin with a molar ratio f/p of 1.5 is employed. Various quantities of aniline and diethylaniline are added to the resol. The resin is catalyzed with the aid of 10% by weight of the catalyst employed in Example 2. The following table summarizes the results obtained:

| ANILINE % BY WEIGHT | DIETHYL-ANILINE | GEL TIME AT 20° C. (minutes) | REACTIVITY WHEN HEATED Temperature (°C.) | Peak (minutes) |
|---|---|---|---|---|
| 0 | | 10 | 116 | 14 |
| 1 | | 21 | 120 | 29 |
| 2 | | 40 | 104 | 50 |
|  | 1 | 14 | 126 | 20 |
|  | 2 | 25 | 115 | 35 |

It is found that diethylaniline is less effective than aniline. Moreoever, when the resin is heated, an unpleasant odor of diethylaniline is released.

EXAMPLE 5

Instead of adding aniline directly to the resol as done according to the present invention, an addition product of formaldehyde and aniline was prepared beforehand which was then added to the resol. This intermediate product is made by adding 46.5 g of aniline (0.5 mole) to 50 g of a 30% strength solution of formaldehyde (0.5 mole). An exothermic reaction is then observed which results in a viscous product to which dipropylene glycol is added. The product obtained is insoluble in water and also insoluble in the resol and in dipropylene glycol.

Relating to "reactivity when heated" this is a reactivity test. According to this test phenolic resin and catalyst are mixed and placed in an isotherm cell. A thermocouple is placed inside the mixture. When catalyst is added, there is an exothermic reaction. Temperature is measured then a courbe is traced with temperature in Y-axis and time in X-axis; at the end of the reaction, an exothermic peak appears: this peak definite the reactivity.

For a given resin when time is short, this meaning that resin is reactive. In examples, it is noted that when anilin is added time is long: this meaning that the resin is less reactive. In others words the pot life is improved.

The reactivity of starting resol is determined according to the identical test described hereabove but sulfuric acid is used instead of catalyst used in examples and moreover ethyl alcohol is added in resol. This test is achieved in order to determine the reactivity and the condensation degree of phenolic resin. When a resin has a reactivity of 110° C. (example 1) this meaning that resin is more reactive and less condensed than a resin which has a reactivity of 80° C. (example 2).

The preceding examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for hardening phenol-formaldehyde resol resins, comprising conducting the hardening of the resins with an acidic solution of water and/or an organic solvent having dissolved therein an aromatic sulphonic acid and/or concentrated sulphuric acid, the improvement comprising conducting the hardening in the presence of aniline added to the phenolic resin beforehand in a quantity of between about 0.5 and 2% relative to the weight of the phenolic resin.

2. A process according to claim 1, wherein the quantity of aniline employed is between about 0.8 and 1.5% relative to the weight of the phenolic resin.

3. A process according to claim 1 wherein the formaldehyde to phenol molar ratio is about 1.5:1 to 2.5:1.

4. A process according to claim 1 wherein the hardening catalyst concentration is about 4–25% based on the weight of the phenolic resin.

5. A process according to claim 1 wherein the hardening catalyst concentration is about 6–12% based on the weight of the phenolic resin.

6. A composition consisting essentially of an uncured phenol-formaldehyde resol and about 0.5–2% aniline by weight relative to the weight of the resol.

7. A composition according to claim 6 containing 0.8–1.5% by aniline.

8. A process according to claim 1 conducted in the presence of a reinforcing agent.

9. A process according to claim 8 wherein said reinforcing agent in glass, asbestos, or cellulose fiber or fabric.

10. A process according to claim 8 wherein the reinforcing agent is glass rovings.

11. A prepeg produced according to claim 8.

12. A prepeg produced according to claim 9.

13. A prepeg produced according to claim 10.

* * * * *